(12) United States Patent
Izumi et al.

(10) Patent No.: US 9,777,463 B2
(45) Date of Patent: Oct. 3, 2017

(54) CONSTRUCTION MACHINE

(71) Applicants: HITACHI CONSTRUCTION MACHINERY CO., LTD., Tokyo (JP); Takako Satake, Ishioka (JP)

(72) Inventors: Shiho Izumi, Hitachinaka (JP); Shinya Imura, Toride (JP); Hidetoshi Satake, Ishioka (JP); Kouji Ishikawa, Kasumigaura (JP); Tomoaki Kaneta, Kasumigaura (JP); Hiroaki Amano, Kasumigaura (JP); Shinji Nishikawa, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/767,423

(22) PCT Filed: Aug. 20, 2014

(86) PCT No.: PCT/JP2014/071774
§ 371 (c)(1),
(2) Date: Aug. 12, 2015

(87) PCT Pub. No.: WO2015/025886
PCT Pub. Date: Feb. 26, 2015

(65) Prior Publication Data
US 2016/0002887 A1    Jan. 7, 2016

(30) Foreign Application Priority Data
Aug. 22, 2013 (JP) .................. 2013-172465

(51) Int. Cl.
*E02F 9/20* (2006.01)
*E02F 9/22* (2006.01)
(Continued)

(52) U.S. Cl.
CPC ............ *E02F 9/2235* (2013.01); *E02F 9/123* (2013.01); *E02F 9/2004* (2013.01);
(Continued)

(58) Field of Classification Search
CPC ..... E02F 9/2235; E02F 9/2282; E02F 9/2091; E02F 9/2075; E02F 9/2095; E02F 9/2004;
(Continued)

(56) References Cited

U.S. PATENT DOCUMENTS

2013/0245899 A1* 9/2013 Lee ........................ E02F 9/128
                                                                    701/50
2014/0199148 A1   7/2014 Imura et al.

FOREIGN PATENT DOCUMENTS

EP    2 573 281 A1    3/2013
EP    2 597 207 A1    5/2013
(Continued)

OTHER PUBLICATIONS

Machine Translation of JP2012-153174, printed Dec. 11, 2016.*
(Continued)

*Primary Examiner* — Redhwan k Mawari
*Assistant Examiner* — Alan D Hutchinson
(74) *Attorney, Agent, or Firm* — Mattingly & Malur, PC

(57) ABSTRACT

A construction machine, comprising a hydraulic pump, a swing hydraulic motor, a swing electric motor, a delivery capacity regulating device, and a control unit which controls the driving/braking of the swing structure, is configured to comprise an operation amount detection device for detecting the operation amount of the swing control lever and a speed detection device for detecting the speed of the swing electric motor. The control unit includes a hydraulic pump output reduction control unit which takes in an operation amount signal representing the operation amount of the swing control lever detected by the operation amount detection device (Continued)

and a speed signal representing the speed of the swing electric motor detected by the speed detection device and controls the delivery capacity regulating device by calculating a reduction rate of the output of the hydraulic pump based on the detection signals.

3 Claims, 9 Drawing Sheets

(51) Int. Cl.
 *H02P 6/08* (2016.01)
 *E02F 9/12* (2006.01)
 *F04B 49/00* (2006.01)
 *B60L 1/00* (2006.01)

(52) U.S. Cl.
 CPC .......... *E02F 9/2075* (2013.01); *E02F 9/2091* (2013.01); *E02F 9/2095* (2013.01); *E02F 9/2267* (2013.01); *E02F 9/2282* (2013.01); *E02F 9/2285* (2013.01); *E02F 9/2296* (2013.01); *F04B 49/002* (2013.01); *H02P 6/08* (2013.01); *B60L 1/00* (2013.01); *Y02T 10/642* (2013.01)

(58) Field of Classification Search
 CPC ..... E02F 9/2296; E02F 9/2267; E02F 9/2285; E02F 9/123; F04B 49/002; H02P 6/08; Y02T 10/642; B60L 1/00
 See application file for complete search history.

(56) References Cited

FOREIGN PATENT DOCUMENTS

| JP | 2008-063888 A | | 3/2008 |
| JP | 2012-153174 A | | 8/2012 |
| JP | 2012-162861 A | | 8/2012 |
| JP | 2012153174 A | * | 8/2012 |

OTHER PUBLICATIONS

International Search Report of PCT/JP2014/071774.
International Preliminary Report on Patentability received in corresponding International Application No. PCT/JP2014/071774 dated Mar. 3, 2016.
Extended European Search Report received in corresponding European Application No. 14837337.6 dated Mar. 10, 2017.

* cited by examiner

CONSTRUCTION MACHINE

TECHNICAL FIELD

The present invention relates to a construction machine having a swing structure such as a hydraulic excavator, and in particular, to a construction machine having an electric motor and a hydraulic motor for driving the swing structure.

BACKGROUND ART

It prevails that construction machines having a swing structure (e.g., hydraulic excavators) rotates a hydraulic motor by driving a hydraulic pump with an engine and by using hydraulic fluid delivered from the hydraulic pump, thereby driving the swing structure (as an inertial body). In recent years, however, in order to improve the fuel efficiency of the engine, lower the noise level, reduce exhaust gas emission, and so forth, there have been proposed hybrid construction machines in which the swing structure is driven by using both the hydraulic motor and an electric motor that performs the driving by use of electric energy supplied from an electrical storage device. In such hybrid construction machines, it is necessary to appropriately control the drive torque (generated by the shared work of the hydraulic motor and the electric motor) so that operators accustomed to the operation of conventional construction machines can operate the hybrid construction machine with no feeling of strangeness.

As a conventional technology designed for the purpose of enabling continuous and smooth drive control of the swing structure (as an inertial body) and efficient energy regeneration, there exists control means for a hybrid construction machine (see Patent Literature 1, for example). The control means calculates a torque command value for the swing electric motor (electric motor used for the swing driving) based on the differential pressure occurring between two ports of the swing hydraulic motor (hydraulic motor used for the swing driving) serving as a hydraulic fluid suction hole (inlet side) and a hydraulic fluid discharge hole (outlet side).

PRIOR ART LITERATURE

Patent Literature

Patent Literature 1: JP, A 2008-63888

SUMMARY OF THE INVENTION

Problem to be Solved by the Invention

In the above conventional technology described in the Patent Literature 1, the ratio of the electric motor's torque in the total torque used for driving the swing structure is changed between accelerative driving and decelerative driving of the swing structure. Therefore, when the electric motor is in failure and incapable of outputting the prescribed torque, for example, there is a possibility that only the torque from the hydraulic motor is available and the torque requested by the operator (torque corresponding to the operation amount of the swing control lever) cannot be obtained.

Further, while the Patent Literature 1 includes a description of energy saving achieved by using the electric motor as a generator and having the electric motor convert the kinetic energy of the inertial body into electric energy and recover the energy, the literature includes no description of a method for efficiently using the energy at times of the electric motor driving. For example, the literature does not refer to techniques such as efficient control of the hydraulic motor and the hydraulic pump (which supplies the hydraulic fluid to the hydraulic motor) at times of the power running driving by the electric motor. Thus, from the viewpoint of energy saving of the whole construction machine, the conventional technology involves a problem in that sufficient fuel cost reduction effect cannot be achieved.

The object of the present invention, which has been made in consideration of the above-described situation, is to provide a construction machine capable of securing excellent operability and achieving great fuel reduction effect by efficiently using the recovered energy.

Means for Solving the Problem

To achieve the above object, according to a first aspect of the present invention, there is provided a construction machine comprising: an engine; a hydraulic pump of the variable displacement type which is driven by the engine; a swing structure; a swing hydraulic motor which drives the swing structure by using hydraulic fluid delivered from the hydraulic pump; an electrical storage device which stores and supplies electric power; a swing electric motor which drives the swing structure by using the electric power supplied from the electrical storage device; a swing control lever which is operated for commanding the driving of the swing structure; a delivery capacity regulating device which regulates the delivery capacity of the hydraulic pump; and a control unit which controls the driving/braking of the swing structure by using the sum total of torque of the swing hydraulic motor and torque of the swing electric motor by driving both the swing hydraulic motor and the swing electric motor when the swing control lever is operated. The construction machine comprises an operation amount detection device which detects the operation amount of the swing control lever and a speed detection device which detects the speed of the swing electric motor. The control unit includes a hydraulic pump output reduction control unit which takes in an operation amount signal representing the operation amount of the swing control lever detected by the operation amount detection device and a speed signal representing the speed of the swing electric motor detected by the speed detection device and controls the delivery capacity regulating device by calculating a reduction rate of the output of the hydraulic pump based on the detection signals.

According to a second aspect of the present invention, there is provided the construction machine as described in the first aspect, the control unit includes: a torque command value calculation unit which takes in the operation amount signal representing the operation amount of the swing control lever detected by the operation amount detection device and the speed signal representing the speed of the swing electric motor detected by the speed detection device and calculates a torque command value for the swing electric motor based on the detection signals; and a hydraulic pump output reduction control unit which controls the delivery capacity regulating device by calculating the reduction rate of the output of the hydraulic pump based on the torque command value for the swing electric motor calculated by the torque command value calculation unit, the operation amount of the swing control lever and the speed of the swing electric motor.

According to a third aspect of the present invention, there is provided the construction machine as described in the second aspect, the hydraulic pump output reduction control unit calculates the reduction rate of the output of the hydraulic pump as a lower value with the increase in the operation amount of the swing control lever.

According to a fourth aspect of the present invention, there is provided the construction machine as described in the second aspect, the hydraulic pump output reduction control unit calculates the reduction rate of the output of the hydraulic pump as a lower value with the increase in the speed of the swing electric motor.

Effect of the Invention

According to the present invention, at the time of the power running of the swing electric motor, the control is performed to reduce the power of the hydraulic pump by considering the output of the swing electric motor while taking the hydraulic pump efficiency into account. Therefore, power of the hydraulic pump necessary for the swing driving can be secured. Consequently, excellent operability can be secured and a great fuel cost reduction effect can be achieved.

MODE FOR CARRYING OUT THE INVENTION

Figure 1:
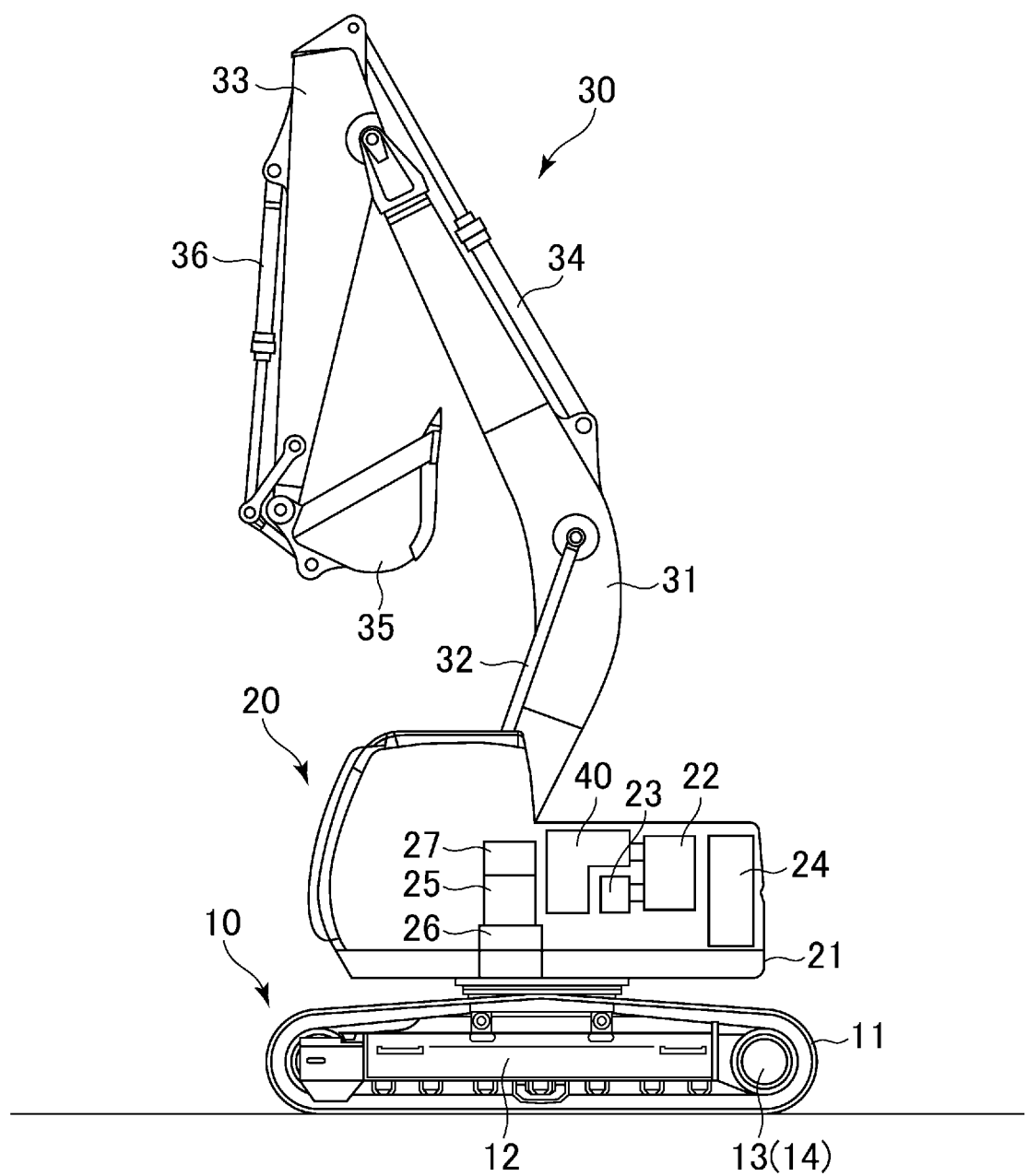
FIG. 1 is a side view showing a construction machine according to an embodiment of the present invention.
Figure 2:
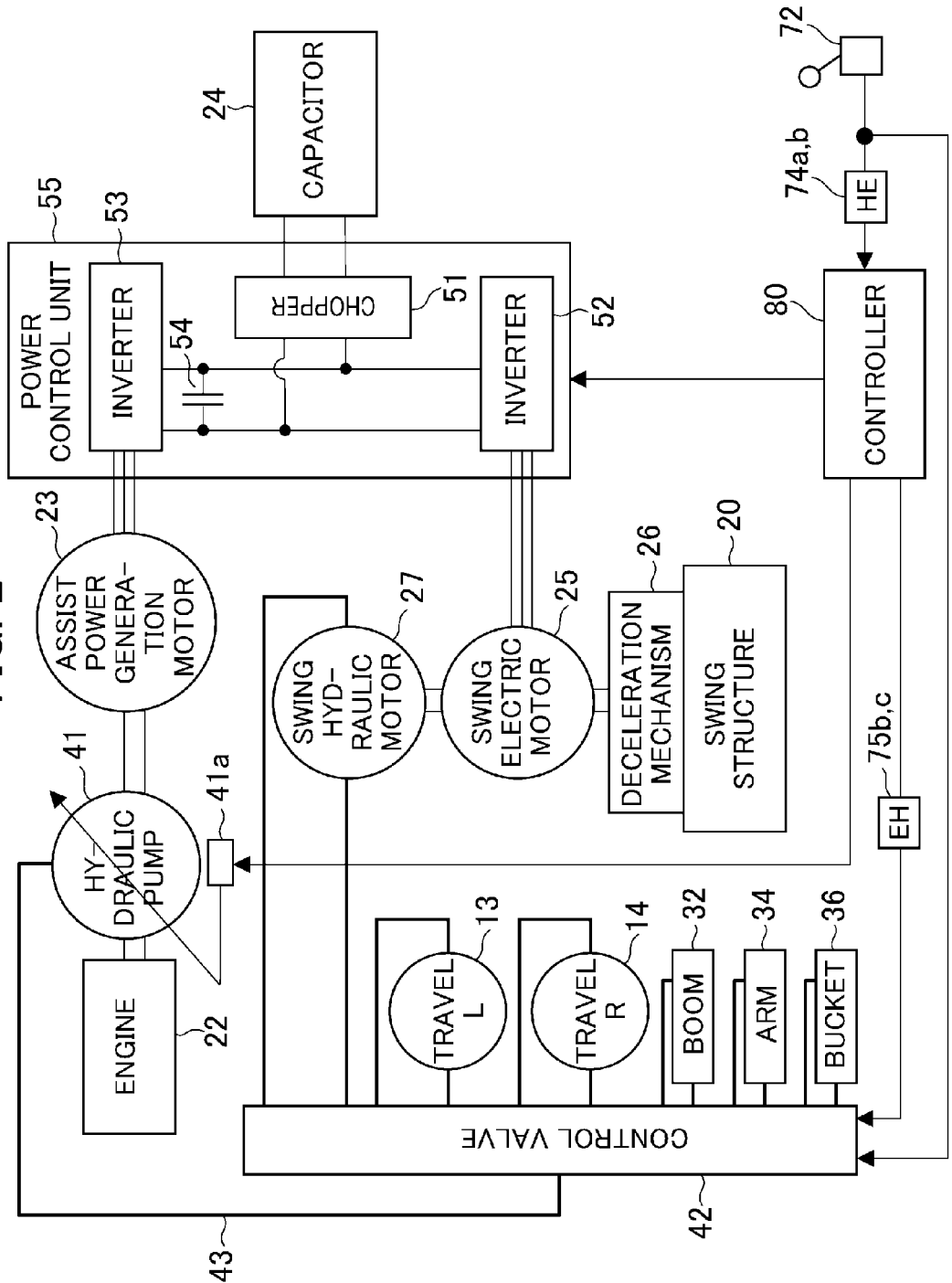
FIG. 2 is a system configuration diagram of electric/hydraulic devices constituting the construction machine according to the embodiment of the present invention.
Figure 3:
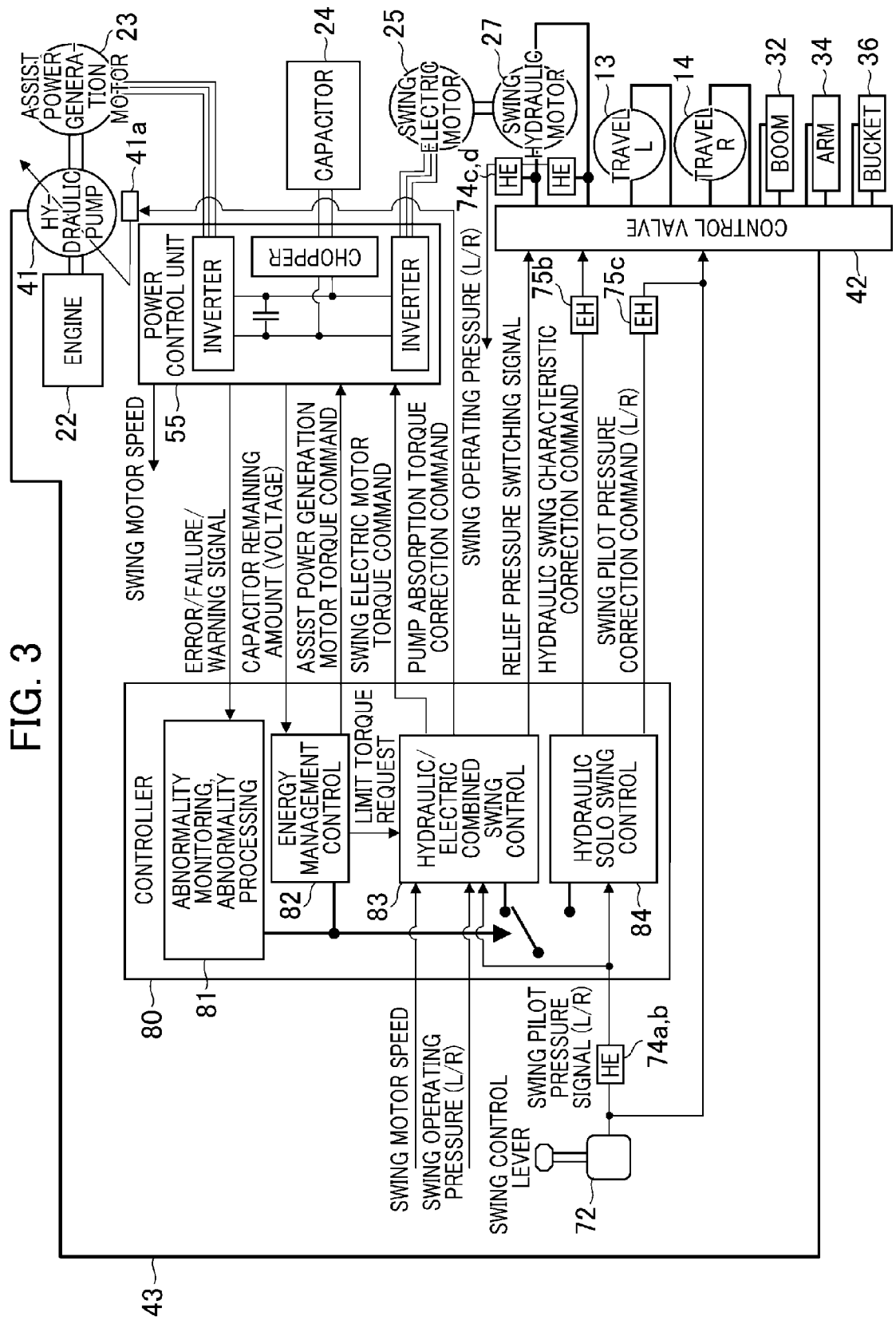
FIG. 3 is a block diagram showing the system configuration and control blocks of the construction machine according to the embodiment of the present invention.

In the following, an embodiment of the present invention will be described with reference to figures by taking a hydraulic excavator as an example of a construction machine. The present invention is applicable generally to a variety of construction machines (e.g., work machines) having a swing structure, and thus the application of the present invention is not restricted to hydraulic excavators. FIG. 1 is a side view showing a construction machine according to an embodiment of the present invention. FIG. 2 is a system configuration diagram of electric/hydraulic devices constituting the construction machine according to the embodiment of the present invention. FIG. 3 is a block diagram showing the system configuration and control blocks of the construction machine according to the embodiment of the present invention.

In FIG. 1, the hydraulic excavator comprises a track structure 10, a swing structure 20 mounted on the track structure 10 to be rotatable, and a front work implement 30 attached to the swing structure 20.

The track structure 10 includes a pair of crawlers 11 (only one side is shown in FIG. 1), a pair of crawler frames 12 (only one side is shown in FIG. 1), a pair of travel hydraulic motors 13 and 14 for independently driving and controlling the crawlers 11, respectively, deceleration mechanisms for the travel hydraulic motors 13 and 14, and so forth.

The swing structure 20 includes a swing frame 21, an engine 22 (as a prime mover) mounted on the swing frame 21, an assist power generation motor 23 driven by the engine 22, a swing electric motor 25, a swing hydraulic motor 27, an electric double layer capacitor 24 connected to the assist power generation motor 23 and the swing electric motor 25, a deceleration mechanism 26 for decelerating the rotation of the swing electric motor 25 and the swing hydraulic motor 27, and so forth. The drive force of the swing electric motor 25 and the swing hydraulic motor 27 is transmitted via the deceleration mechanism 26. By the drive force, the swing structure 20 (swing frame 21) is driven and rotated with respect to the track structure 10.

The swing structure 20 is equipped with the front work implement 30. The front work implement 30 includes a boom 31, a boom cylinder 32 for driving the boom 31, an arm 33 supported by the tip end part of the boom 31 to be rotatable around an axis, an arm cylinder 34 for driving the arm 33, a bucket 35 supported by the tip end of the arm 33 to be rotatable around an axis, a bucket cylinder 36 for driving the bucket 35, and so forth.

A hydraulic system 40 for driving hydraulic actuators (such as the travel hydraulic motors 13 and 14, the swing hydraulic motor 27, the boom cylinder 32, the arm cylinder 34 and the bucket cylinder 36) is mounted on the swing frame 21 of the swing structure 20. The hydraulic system 40 includes a hydraulic pump 41 (see FIG. 2) driven and rotated by the engine 22 and serving as a hydraulic pressure source and a control valve 42 (see FIG. 2) for driving and controlling the actuators.

Next, the system configuration of the electric/hydraulic devices of the hydraulic excavator will be explained briefly. As shown in FIG. 2, the drive force of the engine 22 is transmitted to the hydraulic pump 41. The control valve 42 controls the flow rate and the direction of the hydraulic fluid supplied to the swing hydraulic motor 27 according to a swing operation command (hydraulic pilot signal) inputted from a swing control lever device 72. The control valve 42 also controls the flow rate and the direction of the hydraulic fluid supplied to each of the boom cylinder 32, the arm cylinder 34, the bucket cylinder 36 and the travel hydraulic motors 13 and 14 according to operation commands (hydraulic pilot signals) inputted from control lever devices (unshown) for operations other than the swinging.

Incidentally, the control valve 42 in this embodiment has been configured so that its bleed-off opening area when the operation amount of the swing control lever is in an intermediate range (between the neutral and the maximum) is larger than that in ordinary machines and the drive torque of the swing hydraulic motor 27 (torque in the direction of driving the swing structure 20) when the operation amount is in the intermediate range is lower than that in the ordinary machines.

As shown in FIG. 2, a swing control system includes a controller 80 which outputs a control signal (according to the command from the control lever device 72) to the control valve 42 and a power control unit 55 which controls the charging and discharging of the capacitor 24. The power control unit 55 is a unit for controlling the supply of the electric power from the capacitor 24 to the swing electric motor 25 and the charging of the capacitor 24 with the electric power recovered from the swing electric motor 25. The power control unit 55 includes a chopper 51 for boosting the voltage of DC power supplied from the capacitor 24 up to a prescribed bus line voltage, an inverter 52 for driving the swing electric motor 25, an inverter 53 for driving the assist power generation motor 23, and a smoothing capacitor 54 provided for stabilizing the bus line voltage. Rotating shafts of the swing electric motor 25 and the swing hydraulic motor 27 are connected together. The swing structure 20 is driven by the total torque generated by these motors. The capacitor 24 is charged or discharged depending on the driving status (regenerating or power running) of the assist power generation motor 23 and the swing electric motor 25.

Next, devices, control means, control signals, etc. necessary for performing the swing control according to the present invention will be explained in more detail by referring to FIG. 3.

The hydraulic excavator comprises the controller 80 explained above and hydraulic/electric signal conversion units 74a, 74b, 74c and 74d and electric/hydraulic signal conversion units 75b and 75c related to the input/output of the controller 80. These components constitute the swing control system. The hydraulic/electric signal conversion units 74a, 74b, 74c and 74d are implemented by pressure sensors, for example. The electric/hydraulic signal conversion units 75b and 75c are implemented by electromagnetic proportional pressure reducing valves, for example.

As shown in FIG. 3, the controller 80 includes an abnormality monitoring/abnormality processing control block 81, an energy management control block 82, a hydraulic/electric combined swing control block 83, and a hydraulic solo swing control block 84.

Error/failure/warning signals outputted from the power control unit 55 are inputted to the abnormality monitoring/abnormality processing control block 81. The energy management control block 82 receives a capacitor remaining amount signal, a chopper current signal and a swing motor speed outputted from the power control unit 55 and swing operating pressures which have been outputted from the control valve 42 and converted by the hydraulic/electric signal conversion units (e.g., pressure sensors) 74c and 74d into electric signals, and outputs a braking torque request value to be sent to the hydraulic/electric combined swing control block 83.

The hydraulic/electric combined swing control block 83 receives swing pilot pressure signals which have been outputted from the swing control lever 72 and converted by the hydraulic/electric signal conversion units (e.g., pressure sensors) 74a and 74b into electric signals, the swing motor speed outputted from the power control unit 55, and the swing operating pressures which have been outputted from the control valve 42 and converted by the hydraulic/electric signal conversion units (e.g., pressure sensors) 74c and 74d into electric, signals. The hydraulic/electric combined swing control block 83 outputs a pump absorption torque correction command for the hydraulic pump 41 to a regulator 41a which serves as a delivery capacity regulating device. The hydraulic/electric combined swing control block 83 also outputs a relief pressure switching signal to the control valve 42 and a swing electric motor torque command to the power control unit 55.

The hydraulic solo swing control block 84 receives the swing pilot pressure signals which have been outputted from the swing control lever 72 and converted by the hydraulic/electric signal conversion units 74a and 74b into electric signals, and outputs a hydraulic swing characteristic correction command and a swing pilot pressure correction signal for the control valve 42 via the electric/hydraulic signal conversion units 75b and 75c.

Figure 4:
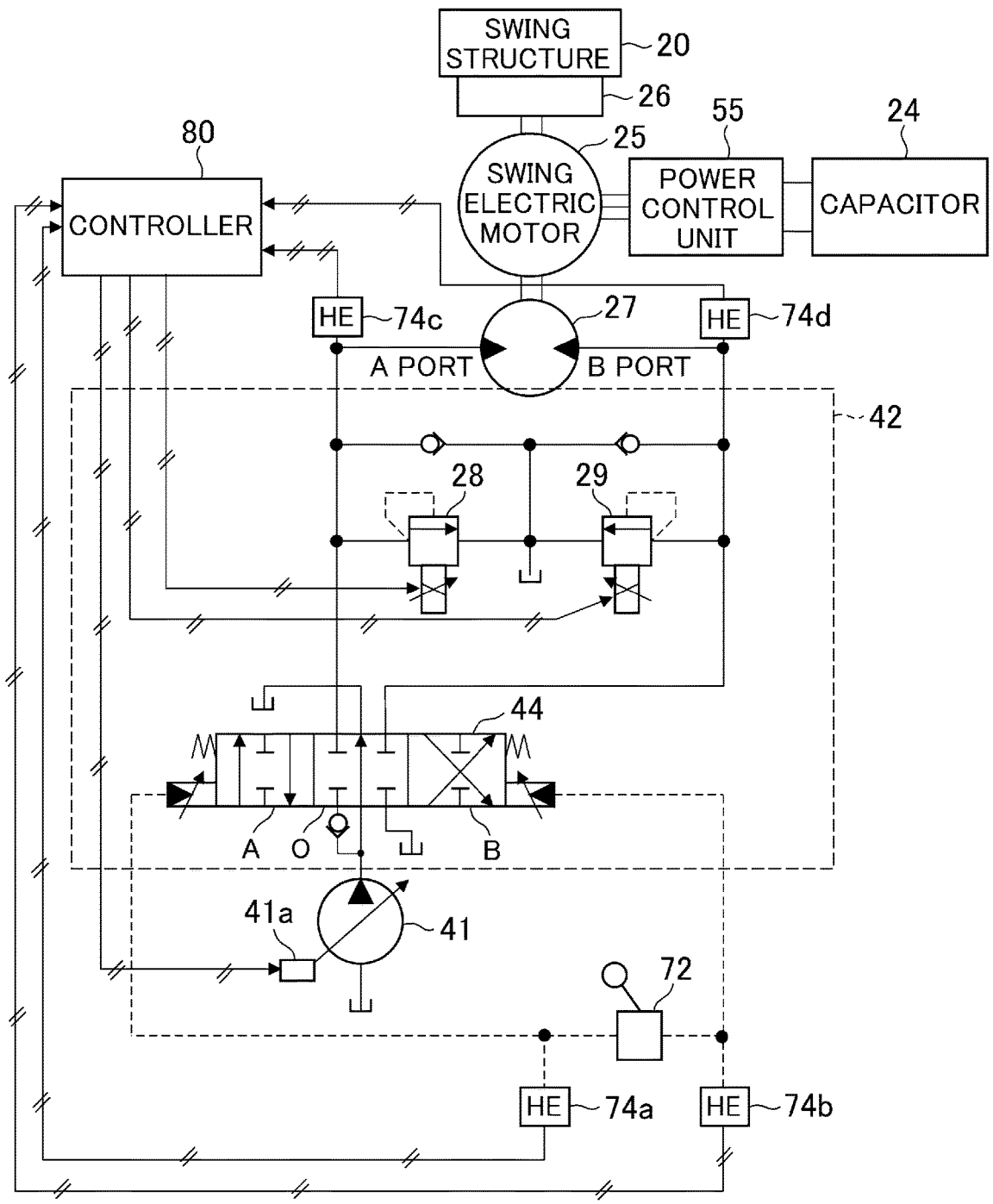
FIG. 4 is a system configuration diagram showing a hydraulic system of the construction machine according to the embodiment of the present invention.
Figure 5:
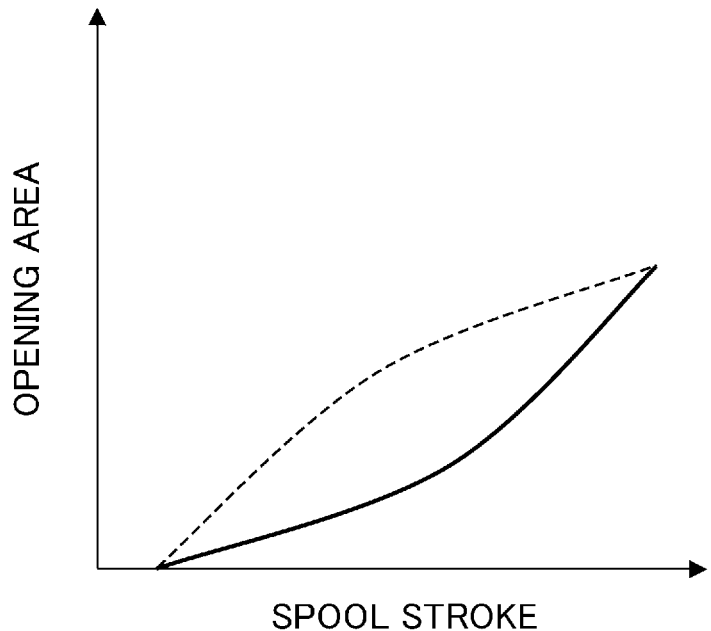
FIG. 5 is a characteristic diagram showing a meter-out opening area characteristic of a swing spool in the construction machine according to the embodiment of the present invention.

Next, a swing hydraulic system in the construction machine according to the embodiment of the present invention will be explained below by referring to FIGS. 4 and 5. FIG. 4 is a system configuration diagram showing the hydraulic system of the construction machine according to the embodiment of the present invention. FIG. 5 is a characteristic diagram showing the meter-out opening area characteristic of a swing spool in the construction machine according to the embodiment of the present invention. Reference characters in FIGS. 4 and 5 identical to those in FIGS. 1-3 represent elements identical to those in FIGS. 1-3, and thus detailed explanation thereof is omitted here.

The control valve 42 shown in FIG. 3 has a valve component called "spool" for each actuator. In response to a command (hydraulic pilot signal) from the swing control lever 72 or another unshown operating device, a corresponding spool shifts so as to change the opening area, by which the flow rate of the hydraulic fluid passing through each hydraulic line changes. In the swing hydraulic system shown in FIG. 4, the control valve 42 includes a swing spool 44, variable overload relief valves 28 and 29, and so forth.

In FIG. 4, the swing hydraulic system includes the aforementioned hydraulic pump 41 and swing hydraulic motor 27, the swing control lever 72, the swing spool 44, and the electromagnetic variable overload relief valves 28 and 29 for the swinging.

The hydraulic pump 41 is a variable displacement pump having the regulator 41a. By the operation of the regulator 41a, the tilting angle of the hydraulic pump 41 is changed, the displacement of the hydraulic pump 41 is changed, and consequently, the delivery flow rate and the output torque of the hydraulic pump 41 are changed. When the pump absorption torque correction command is outputted from the hydraulic/electric combined swing control block 83 shown FIG. 3 to the regulator 41a serving as the delivery capacity regulating device, the regulator 41a operates and the tilting angle of the hydraulic pump 41 is changed, by which the maximum output torque of the hydraulic pump 41 can be reduced.

The hydraulic fluid from the hydraulic pump 41 is switched and supplied to the swing hydraulic motor 27 by the swing spool 44 which is switched continuously from a neutral position O to a position A (e.g., left swing position) or a position B (e.g., right swing position). The hydraulic lines have been connected so that the hydraulic fluid from the hydraulic pump 41 returns to a tank through a bleed-off throttle when the swing spool 44 is at the neutral position O.

The swing hydraulic motor 27 has two ports serving as the inlet and the outlet for the hydraulic fluid. In this embodiment, the port serving as the inlet for the hydraulic fluid at the time of swinging leftward is defined as an A port and the port serving as the outlet at the time of swinging leftward is defined as a B port. Thus, the port serving as the inlet for the hydraulic fluid at the time of swinging rightward is defined as the B port and the port serving as the outlet at the time of swinging rightward is defined as the A port. The hydraulic line (piping) connected to the A port of the swing hydraulic motor 27 is provided with the hydraulic/electric signal conversion unit 74c (pressure sensor for detecting the pressure), while the hydraulic line (piping) connected to the B port of the swing hydraulic motor 27 is provided with the hydraulic/electric signal conversion unit 74d.

The variable overload relief valve 28 is a valve for controlling the A port pressure of the swing hydraulic motor 27. The variable overload relief valve 28 switches its relief pressure in response to an electric command from the controller 80 received by its electromagnetic operating part. Similarly, the variable overload relief valve 29 is a valve for controlling the B port pressure of the swing hydraulic motor 27. The variable overload relief valve 29 switches its relief pressure in response to an electric command from the controller 80 received by its electromagnetic operating part.

The swing control lever 72 includes a pressure reducing valve which reduces pressure supplied from a pilot hydraulic pressure source (unshown) connected thereto according to the lever operation amount. The swing control lever 72 applies a pressure (hydraulic pilot signal) corresponding to the lever operation amount to a left or right operating part of the swing spool 44. The swing spool 44 is switched continuously from the neutral position O to the position A or B according to the swing operation command (hydraulic pilot signal) from the swing control lever 72.

When the swing control lever 72 is in the neutral state, the swing spool 44 is situated at the neutral position O and all of the hydraulic fluid delivered from the hydraulic pump 41 returns to the tank through the bleed-off throttle. In contrast, when the swing control lever 72 is operated so as to perform the left swing, the swing spool 44 is switched to the position A, the opening area of the bleed-off throttle decreases, and the opening areas of the meter-in throttle and the meter-out throttle of the swing spool 44 increase. The hydraulic fluid delivered from the hydraulic pump 41 is sent to the A port of the swing hydraulic motor 27 through the meter-in throttle at the position A. The return fluid from the swing hydraulic motor 27 returns to the tank through the meter-out throttle at the position A. By such control of the hydraulic fluid, the swing hydraulic motor 27 is rotated leftward.

Further, when the swing control lever 72 is operated so as to perform the right swing, for example, the swing spool 44 is switched to the position B, the opening area of the bleed-off throttle decreases, and the opening areas of the meter-in throttle and the meter-out throttle of the swing spool 44 increase. The hydraulic fluid delivered from the hydraulic pump 41 is sent to the B port of the swing hydraulic motor 27 through the meter-in throttle at the position B. The return fluid from the swing hydraulic motor 27 returns to the tank through the meter-out throttle at the position B. By such control of the hydraulic fluid, the swing hydraulic motor 27 is rotated rightward, reversely to the case of the position A.

When the swing spool 44 is situated at an intermediate position between the neutral position O and the position A, the hydraulic fluid delivered from the hydraulic pump 41 is distributed to the bleed-off throttle and the meter-in throttle. In this case, pressure corresponding to the opening area of the bleed-off throttle develops on the inlet side of the meter-in throttle. By the pressure, the hydraulic fluid is supplied to the swing hydraulic motor 27 and operating torque corresponding to the pressure (opening area of the bleed-off throttle) is applied to the swing hydraulic motor 27. The hydraulic fluid discharged from the swing hydraulic motor 27 receives resistance corresponding to the opening area of the meter-out throttle at that time (back pressure), by which braking torque corresponding to the opening area of the meter-out throttle is generated. The same goes for cases where the swing spool 44 is situated at an intermediate position between the neutral position O and the position B.

When the swing control lever 72 is returned to its neutral position and the swing spool 44 is returned to the neutral position O, the swing hydraulic motor 27 tends to keep on rotating due to the inertia of the swing structure 20 (inertial body). In this case, when the pressure of the hydraulic fluid discharged from the swing hydraulic motor 27 (back pressure) is about to exceed the preset pressure of the swing variable overload relief valve 28 or 29, the swing variable overload relief valve 28 or 29 operates to drain part of the hydraulic fluid into the tank, by which the increase in the back pressure is limited. Consequently, braking torque corresponding to the preset pressure of the swing variable overload relief valve 28 or 29 is generated.

Each of the swing variable overload relief valves 28 and 29 has the electromagnetic operating part. The preset pressure of each swing variable overload relief valve 28, 29 can be varied by the electric command from the controller 80 received by the electromagnetic operating part.

FIG. 5 is a graph showing a meter-out opening area characteristic of the swing spool 44 with respect to the spool stroke in the embodiment of the present invention. Since the spool stroke represented by the horizontal axis changes depending exclusively on the operation amount of the swing control lever 72, the spool stroke can also be regarded as the operation amount of the swing control lever 72.

In FIG. 5, the solid line represents the characteristic in this embodiment, while the broken line represents a meter-out opening area characteristic capable of securing excellent operability in a conventional hydraulic excavator that drives the swing structure with the swing hydraulic motor alone. The meter-out opening area characteristic of the swing spool 44 in this embodiment is designed so that the meter-out opening area is substantially the same as that in the conventional example at the start point and the end point of the control but is more open (larger) than that in the conventional example in the intermediate range.

With the increase in the opening area of the meter-out throttle of the swing spool 44, the braking torque obtained by the swing hydraulic motor 27 decreases. Since the magnitude of the braking torque is dependent on the opening area of the meter-out throttle in this way, the braking torque of the swing hydraulic motor 27 in this embodiment when the operation amount of the swing control lever 72 is in the intermediate range has been set to be lower than that in the conventional construction machine. Further, since the opening area of the meter-out throttle in this embodiment in the state in which the operation amount of the swing control lever 72 is at the neutral or at the maximum have been set to be substantially equal to that in the conventional construction machine, the magnitude of the braking torque of the swing hydraulic motor 27 has been set to be substantially equal to that in the conventional construction machine in the state.

Furthermore, in this embodiment, the bleed-off opening area characteristic of the swing spool 44 with respect to the spool stroke has been set equal to a bleed-off opening area characteristic capable of securing excellent operability in the conventional hydraulic excavator which drives the swing structure with the swing hydraulic motor alone. Therefore, the drive torque in this embodiment has been set to be equivalent to the drive torque of the swing hydraulic motor of the conventional construction machine.

Figure 6:
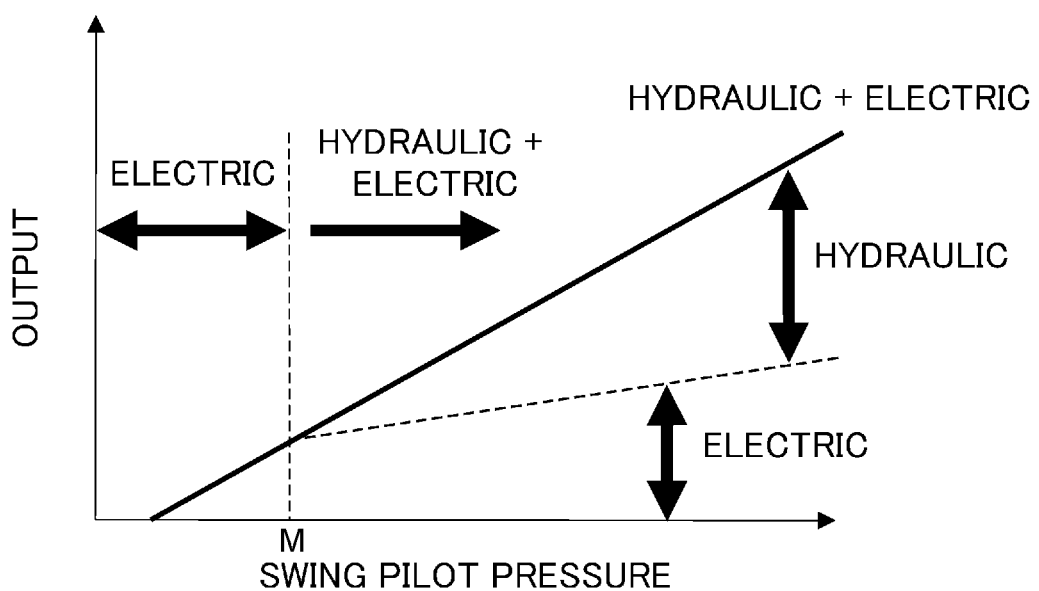
FIG. 6 is a characteristic diagram showing the output characteristic of a swing electric motor and a swing hydraulic motor corresponding to swing pilot pressure in the construction machine according to the embodiment of the present invention.
Figure 7:
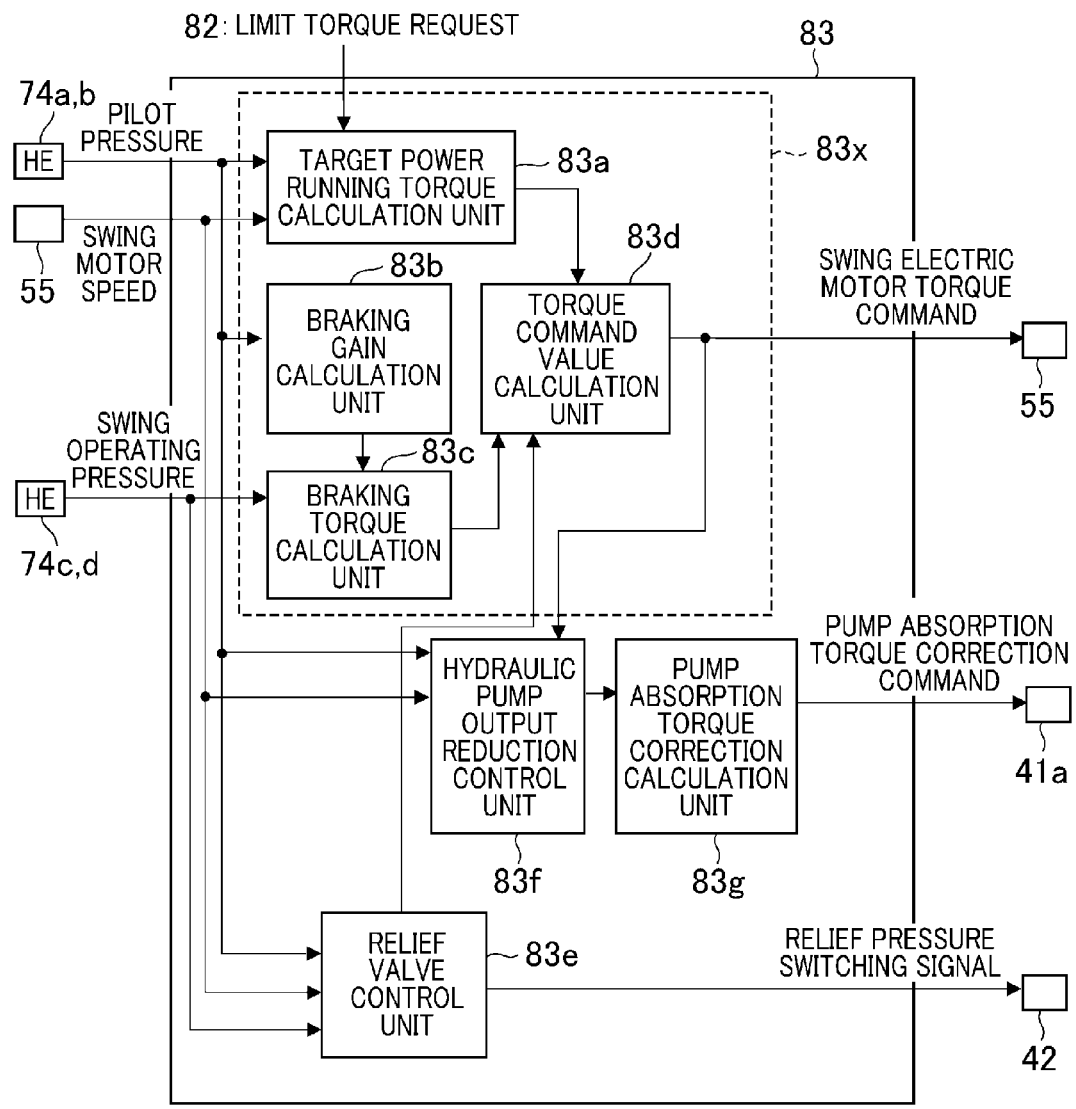
FIG. 7 is a block diagram showing a hydraulic/electric combined swing control block of a controller constituting the construction machine according to the embodiment of the present invention.
Figure 8:
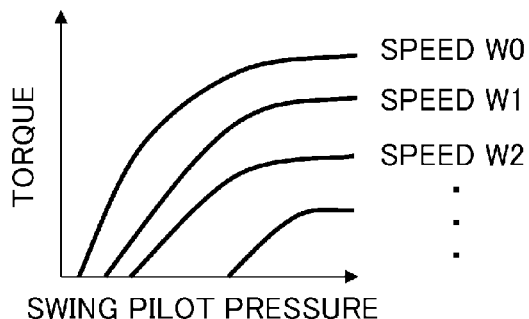
FIG. 8 is a characteristic diagram for calculating electric power running torque based on the swing pilot pressure and swing speed in the construction machine according to the embodiment of the present invention.
Figure 9:
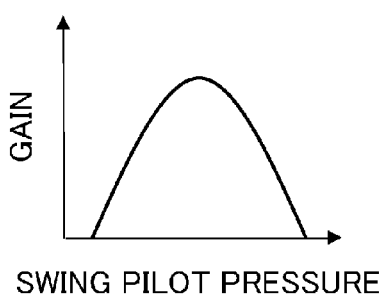
FIG. 9 is a characteristic diagram showing the characteristic of a braking gain corresponding to the swing pilot pressure in the construction machine according to the embodiment of the present invention.
Figure 10:
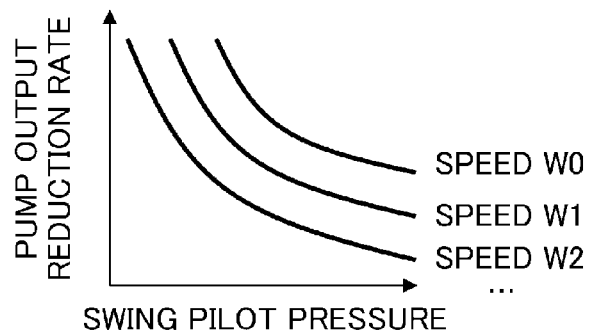
FIG. 10 is a characteristic diagram for calculating a pump output reduction rate based on the swing pilot pressure and the swing speed in the construction machine according to the embodiment of the present invention.

Next, the hydraulic/electric combined swing control block of the controller constituting the construction machine according to the embodiment of the present invention will be explained below by referring to FIGS. 6-10. FIG. 6 is a characteristic diagram showing the output characteristic of the swing electric motor and the swing hydraulic motor corresponding to the swing pilot pressure in the construction machine according to the embodiment of the present invention. FIG. 7 is a block diagram showing the hydraulic/electric combined swing control block of the controller constituting the construction machine according to the embodiment of the present invention. FIG. 8 is a characteristic diagram for calculating electric power running torque based on the swing pilot pressure and the swing speed in the construction machine according to the embodiment of the present invention. FIG. 9 is a characteristic diagram showing the characteristic of a braking gain corresponding to the swing pilot pressure in the construction machine according to the embodiment of the present invention. FIG. 10 is a characteristic diagram for calculating a pump output reduction rate based on the swing pilot pressure and the swing speed in the construction machine according to the embodiment of the present invention. Reference characters in FIGS. 6-10 identical to those in FIGS. 1-5 represent elements identical to those in FIGS. 1-5, and thus detailed explanation thereof is omitted here.

In this embodiment, the swing structure 20 is driven by the total output of the swing hydraulic motor 27 and the swing electric motor 25 while changing the ratio between the output of the swing electric motor 25 and the output of the swing hydraulic motor 27 according to the swing pilot pressure signals corresponding to the operation amount of the swing control lever 72. As shown in FIG. 6, the swing structure is driven with the swing electric motor 25 alone in the range in which the swing pilot pressure is lower than M, and the output of the swing hydraulic motor 27 is increased gradually in the range in which the swing pilot pressure is higher than M. In short, the output characteristic has been set so as to decrease the output ratio of the swing electric motor 25 with the increase in the swing pilot pressure.

This is because the driving with the swing electric motor 25 achieves higher efficiency rather than the driving with the swing hydraulic motor 27 in the range in which the swing pilot pressure is low and the swing speed is low whereas the driving with the swing hydraulic motor 27 achieves higher efficiency in the range in which the swing speed is so high that the swing pilot pressure becomes high. With this setting, reduction in the energy consumption can be achieved.

Especially when the swing operation is a fine operation, the loss occurring in the hydraulic part can be reduced significantly by lowering the pump flow rate approximately to a standby flow rate. For this purpose, it is necessary to reduce the output of the swing hydraulic motor 27 according to the output of the swing electric motor 25. In this embodiment, at times of the swing driving, the aforementioned drive torque is reduced to a level lower than the drive torque of the swing hydraulic motor of the conventional construction machine by reducing the output of the hydraulic pump 41. Further, operability equivalent to that of the conventional construction machine can be secured by setting the aforementioned total output to be equivalent to the full output of the conventional construction machine's swing hydraulic motor that is used when the swing driving is performed with the hydraulic motor alone.

Next, the hydraulic/electric combined swing control block 83 of the controller 80 will be explained below. As shown in FIG. 7, the hydraulic/electric combined swing control block 83 includes a target power running torque calculation unit 83a, a braking gain calculation unit 83b, a braking torque calculation unit 83c, a torque command value calculation unit 83d, a relief valve control unit 83e, a hydraulic pump output reduction control unit 83f and a pump absorption torque correction calculation unit 83g. The target power running torque calculation unit 83a, the braking gain calculation unit 83b, the braking torque calculation unit 83c and the torque command value calculation unit 83d constitute a swing electric motor control unit 83X.

The target power running torque calculation unit 83a receives the swing pilot pressure signals which have been outputted from the swing control lever 72 and converted by the hydraulic/electric signal conversion units (e.g., pressure sensors) 74a and 74b into electric signals, the swing motor speed outputted from the power control unit 55, and the braking torque request value calculated by the energy management control block 82, and calculates a power running torque command Tadd based on these signals. Specifically, the target power running torque calculation unit 83a calculates the power running torque command by referring to a table formed based on the swing lever operation amount and the swing motor speed, for example.

FIG. 8 shows an example of the table. In FIG. 8, the horizontal axis represents the swing pilot pressure which corresponds to the swing lever operation amount. Each of W0, W1, W2, . . . represents the speed in regard to each characteristic line from the lowest speed. The torque command values of the swing electric motor 25 defined by this table are values determined by taking account of the loss caused by the hydraulic circuit part (the swing hydraulic motor 27, the hydraulic pump 41, the control valve 42, etc.) and the efficiency of the electric devices such as the swing electric motor 25 and the inverters.

As shown in FIG. 8, the table has been set so that the power running torque command increases with the increase in the swing pilot pressure (increase in the swing operation) and the power running torque command decreases with the increase in the swing speed. A signal representing the power running torque command calculated by the target power running torque calculation unit 83a is inputted to the torque command value calculation unit 83d.

The braking gain calculation unit 83b receives the swing pilot pressure signal and calculates the braking gain based on the signal. Specifically, the braking gain calculation unit 83b calculates the braking gain by referring to a table formed based on the swing lever operation amount, for example. FIG. 9 shows an example of the table. In this embodiment, the table has been set so that the braking gain hits the maximum in an intermediate operation range of the swing control lever 72. This setting is made for the following reason: As shown in FIG. 5, the meter-out opening area characteristic of the swing spool 44 in this embodiment is designed so that the meter-out opening area is more open (larger) than that in the conventional example in the intermediate operation range of the swing control lever 72, and thus the braking torque in this embodiment can tend to become lower than that in the conventional example in the intermediate operation range. The setting shown in FIG. 9 is made in order to compensate for this tendency. A signal representing the braking gain calculated by the braking gain calculation unit 83b is inputted to the braking torque calculation unit 83c.

The braking torque calculation unit 83c receives the swing operating pressure signals which have been converted by the hydraulic/electric signal conversion units (e.g., pressure sensors) 74c and 74d into electric signals (representing the pressures in the A port and the B port of the swing hydraulic motor 27) and the signal representing the braking gain calculated by the braking gain calculation unit 83b, and calculates a braking motor torque command value Tms1 for the swing electric motor based on these signals. Specifically, swing hydraulic motor torque is calculated from the differential pressure between the A port pressure and the B port pressure of the swing hydraulic motor 27 detected by the pressure sensors 74c and 74d, and the braking motor torque command value Tms1 is calculated by multiplying the swing hydraulic motor torque by the signal of the braking gain calculated by the braking gain calculation unit 83b. The braking motor torque command value Tms1 has been set to be substantially equal to the torque of the hydraulic motor of the conventional construction machine. A signal representing the braking motor torque command value Tms1 calculated by the braking torque calculation unit 83c is inputted to the torque command value calculation unit 83d.

The torque command value calculation unit 83d receives the power running torque command Tadd calculated by the target power running torque calculation unit 83a, the braking motor torque command value Tms1 calculated by the braking torque calculation unit 83c, and a relief command signal (explained later) calculated by the relief valve control unit 83e, and calculates a torque command value Tms for the swing electric motor 25 based on these signals.

Specifically, a torque command value Tms2 for the swing electric motor (Tms2=Tms1+Tadd) is calculated first by adding the braking motor torque command value Tms1 and the power running torque command Tadd together. Subsequently, whether the relief pressure has dropped or not is judged based on the relief command signal calculated by the relief valve control unit 83e, and an electric motor torque command value Tms3 compensating for a decrease in the torque of the swing hydraulic motor 27 (which decreases when the relief pressure has dropped) is calculated. Then, the greater one of the calculated torque command values Tms2 and Tms3 is selected as the torque command value for the swing electric motor 25, and the final torque command Tms is calculated by performing a torque limitation process and a torque change rate limitation process. A signal representing the electric motor torque command value Tms calculated by the torque command value calculation unit 83d is inputted to the inverter 52 (for the swing electric motor 25) of the power control unit 55 and to the hydraulic pump output reduction control unit 83f.

The relief valve control unit 83e receives the swing pilot pressure signals which have been converted by the hydraulic/electric signal conversion units (e.g., pressure sensors) 74a and 74b into electric signals, the swing motor speed outputted from the power control unit 55, and the swing operating pressure signals which have been converted by the hydraulic/electric signal conversion units (e.g., pressure sensors) 74c and 74d into electric signals, and calculates electric commands for the variable overload relief valves 28 and 29 of the control valve 42 (constituting the swing hydraulic system) based on these signals. Signals representing the electric commands calculated by the relief valve control unit 83e are inputted to the electromagnetic operating parts of the variable overload relief valves 28 and 29 of the control valve 42 and to the torque command value calculation unit 83d.

The hydraulic pump output reduction control unit 83f receives the swing pilot pressure signals which have been converted by the hydraulic/electric signal conversion units (e.g., pressure sensors) 74a and 74b into electric signals, the swing motor speed outputted from the power control unit 55, and the signal representing the electric motor torque command value Tms calculated by the torque command value calculation unit 83d, and calculates a pump output reduction command based on these signals. Here, the pump output reduction command is a control command for reducing the amount of work done by the swing hydraulic motor 27 by the amount of work given to the swing structure 20 by the drive torque of the swing electric motor 25.

Specifically, the output Pms of the swing electric motor 25 (Pms=Tms×Ws) is calculated first by multiplying the electric motor torque command value Tms by the swing motor speed Ws. Subsequently, the pump output reduction rate is calculated by referring to a table formed based on the swing lever operation amount and the swing motor speed, for example, and the pump output reduction command is calculated by multiplying the output Pms of the swing electric motor 25 by the pump output reduction rate.

FIG. 10 shows an example of the table. In FIG. 10, the horizontal axis represents the swing pilot pressure which corresponds to the swing lever operation amount. Each of W0, W1, W2, . . . represents the speed in regard to each characteristic line from the lowest speed. The pump output reduction rates defined by this table are values determined by taking account of the loss caused by the hydraulic circuit part (the swing hydraulic motor 27, the hydraulic pump 41, the control valve 42, etc.) and the efficiency of the electric devices such as the swing electric motor 25 and the inverters so that the swing hydraulic motor 27 also outputs necessary torque only.

As shown in FIG. 10, the table has been set so that the pump output reduction rate is high in the swing pilot pressure range in which the swing operation is a fine operation and the pump output reduction rate decreases with the increase in the swing speed. This setting is made in order to perform the control so as to make the swing hydraulic motor 27 also output necessary torque only, by increasing the pump output reduction rate with the decrease in the efficiency of the pumps and valves. A signal representing the pump output reduction command calculated by the hydraulic pump output reduction control unit 83f is inputted to the pump absorption torque correction calculation unit 83g.

The pump absorption torque correction calculation unit 83g receives the signal representing the pump output reduction command calculated by the hydraulic pump output reduction control unit 83f and calculates a pump absorption torque command for the swing electric motor 25 based on this signal. Specifically, a tilting angle of the hydraulic pump 41 corresponding to the pump output reduction command is calculated and a pump absorption torque command as a regulator control command is outputted to the regulator 41a. Accordingly, the tilting angle of the swash plate of the hydraulic pump 41 is controlled by the regulator 41a, by which the output of the hydraulic pump 41 is reduced.

Figure 11:
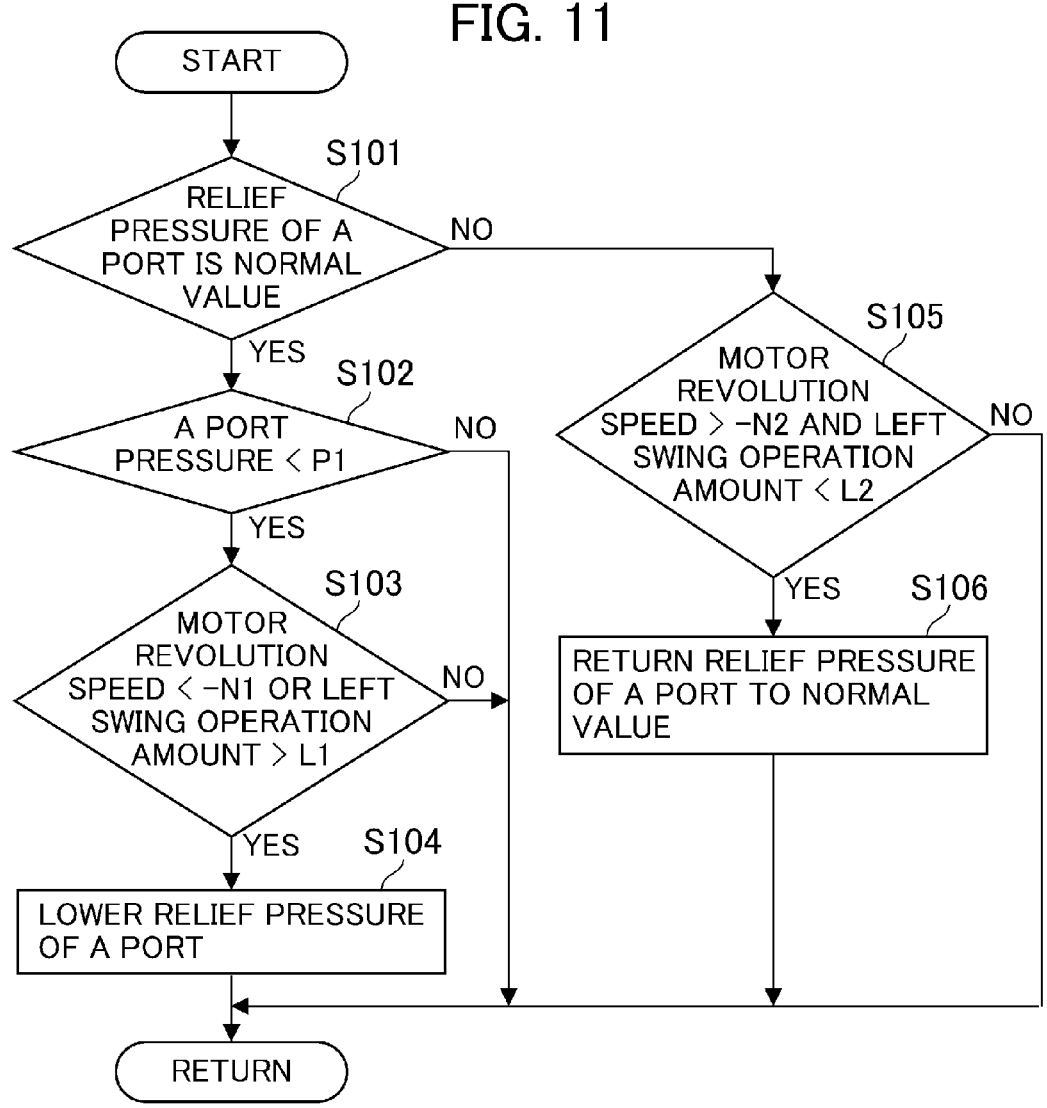
FIG. 11 is a flow chart showing a processing flow for setting relief pressure of a variable overload relief valve in the construction machine according to the embodiment of the present invention.

Next, a method for controlling the variable overload relief valve 28 on the A port's side in the construction machine according to the embodiment of the present invention will be explained below by referring to FIG. 11. FIG. 11 is a flow chart showing a processing flow for setting the relief pressure of the variable overload relief valve in the construction machine according to the embodiment of the present invention.

The process shown in FIG. 11 is executed mainly by the relief valve control unit 83e of the hydraulic/electric combined swing control block 83 of the controller 80.

The relief valve control unit 83e judges whether the relief pressure of the A port is at a normal prescribed value or not (step S101). Specifically, this judgment is made by judging whether a normal setting command regarding the relief pressure has been outputted or not (by checking the previous sampling process). At the system startup of the hydraulic excavator, the relief pressure of the A port has generally been set at the prescribed value. If the relief pressure of the A port is at the normal prescribed value, the process advances to step S102, otherwise the process advances to step S105.

In the step S102, the relief valve control unit 83e judges whether or not the swing operating pressure of the A port is less than a preset threshold value P1. Here, the threshold value P1 has been set at a value not higher than a set pressure used in cases where the preset pressure (preset value) of the relief pressure has been lowered. If the swing operating pressure of the A port is less than the threshold value P1, the process advances to step S103, otherwise the process advances to "RETURN".

In the step S103, the relief valve control unit 83e judges whether or not the swing motor speed is less than −1 times a threshold value N1 (preset positive value) or the leftward swing operation amount of the swing control lever 72 is over a preset threshold value L1. Here, the swing motor speed is defined to represent a left swing by a positive value and a right swing by a negative value. The threshold value N1 has been set at a value in the vicinity of the swing motor speed 0. The threshold value L1 has been set at a value in the vicinity of the zero point of the swing pilot pressure corresponding to the swing lever operation amount. If the swing motor speed is less than −1 times the threshold value N1 (preset positive value) or the leftward swing operation amount of the swing control lever 72 is over the preset threshold value L1, the process advances to step S104, otherwise the process advances to "RETURN".

In the step S104, the relief valve control unit 83e performs control to lower the relief pressure of the A port. Specifically, the relief valve control unit 83e outputs a relief pressure lowering signal to the electromagnetic operating part of the variable overload relief valve 28 of the control valve 42.

After finishing the step S104, or when the swing operating pressure of the A port is judged to be less than the threshold value P1 in the step S102, or when the condition that "the swing motor speed is less than −1 times the threshold value N1 (preset positive value) or the leftward swing operation amount of the swing control lever 72 is over the preset threshold value L1" is not satisfied in the step S103, the relief valve control unit 83e returns to the step S101 via "RETURN" and starts the process again.

If the relief pressure of the A port is judged not to be the normal prescribed value in the step S101, the relief valve control unit 83e judges whether or not the swing motor speed is over −1 times a threshold value N2 (preset positive value) and the leftward swing operation amount of the swing control lever 72 is less than a preset threshold value L2 (step S105). Here, the threshold value N2 has been set at a value not higher than the threshold value N1 and in the vicinity of the swing motor speed 0. The threshold value L2 has been set at a value not higher than the threshold value L1 and in the vicinity of the zero point of the swing pilot pressure corresponding to the swing lever operation amount. If the swing motor speed is over −1 times the threshold value N2 (preset positive value) and the leftward swing operation amount of the swing control lever 72 is less than the preset threshold value L2, the process advances to step S106, otherwise the process advances to "RETURN".

In the step S106, the relief valve control unit 83e performs control to return the relief pressure of the A port to the normal value. Specifically, the relief valve control unit 83e outputs a signal for returning the relief pressure to the normal value to the electromagnetic operating part of the variable overload relief valve 28 of the control valve 42.

After finishing the step S106 or when the condition that "the swing motor speed is over −1 times the threshold value N2 (preset positive value) and the leftward swing operation amount of the swing control lever 72 is less than the preset threshold value L2" is not satisfied in the step S105, the relief valve control unit 83e returns to the step S101 via "RETURN" and starts the process again.

The processing flow of a method for controlling the variable overload relief valve 29 on the B port's side is equivalent to the processing flow of the method for controlling the variable overload relief valve 28 on the A port's side shown in FIG. 11 except that the swing direction (left/right) is opposite and the sign (positive/negative) of the swing speed becomes inverse accordingly. By lowering the relief pressures of the A port and the B port according to the above-described control flow, the braking/drive torque outputted by the swing hydraulic motor 27 can be reduced.

Figure 12:
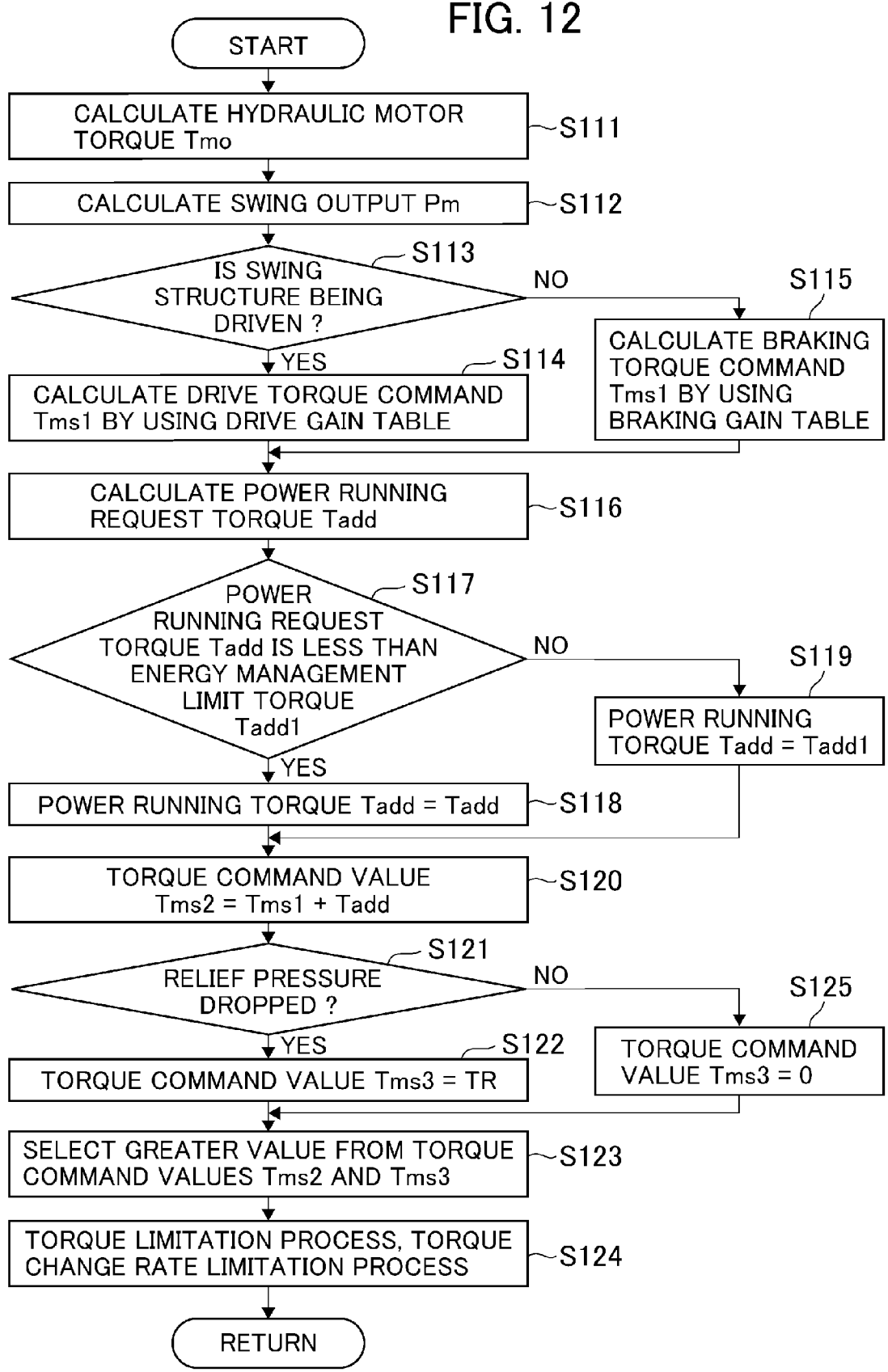
FIG. 12 is a flow chart showing a processing flow for calculating the torque of the swing electric motor in the construction machine according to the embodiment of the present invention.

Next, a method for controlling the swing electric motor 25 in the construction machine according to the embodiment of the present invention will be explained below by referring to FIG. 12. FIG. 12 is a flow chart showing a processing flow for calculating the torque of the swing electric motor in the construction machine according to the embodiment of the present invention. Reference characters in FIG. 12 identical to those in FIGS. 1-11 represent elements identical to those in FIGS. 1-11, and thus detailed explanation thereof is omitted here.

The process shown in FIG. 12 is executed mainly by the swing electric motor control unit 83X which is formed by the target power running torque calculation unit 83a, the braking gain calculation unit 83b, the braking torque calculation unit 83c and the torque command value calculation unit 83d of the controller 80.

The swing electric motor control unit 83X calculates the torque Tmo of the swing hydraulic motor 27 (step S111). Specifically, the swing hydraulic motor torque Tmo is calculated from the differential pressure between the A port pressure and the B port pressure of the swing hydraulic motor 27 detected by the pressure sensors 74c and 74d.

The swing electric motor control unit 83X calculates an output Pm for driving the swing structure 20 (step S112). Specifically, the swing structure output Pm is calculated by adding the torque of the swing hydraulic motor 27 and the torque of the swing electric motor 25 together and multiplying the sum by the speed of the swing electric motor 25 according to the following expression:

$$Pm = (Tmo + Tms) \times Ws \qquad (1)$$

In the expression (1), Tmo represents the swing hydraulic motor torque, Tms represents the swing electric motor torque, and Ws represents the swing speed. Incidentally, the electric motor torque command value Tms3 calculated one sampling cycle ago is used as the swing electric motor torque Tms.

The swing electric motor control unit 83X judges whether the swing structure 20 is being driven or not (step S113). Specifically, the swing structure 20 is judged to be being driven if the swing structure output Pm calculated according to the expression (1) is positive, or to be being braked if the swing structure output Pm is negative. If the swing structure 20 is judged to be being driven, the process advances to step S114, otherwise (being braked) the process advances to step S115.

In the step S114, the swing electric motor control unit 83X calculates a drive motor torque command Tms1 by using a drive gain table. In this embodiment, the drive gain table has been set at 0 since the swing hydraulic motor torque is not calculated based on the setting of the opening area of the swing spool at times of the driving. Thus, the drive motor torque command Tms1 is obtained as 0 (Tms1=0) in the step S114.

When the swing structure 20 is judged to be being braked in the step S113, the swing electric motor control unit 83X calculates the braking motor torque command Tms1 by using a braking gain table (step S115). Specifically, the braking motor torque command Tms1 is calculated by the braking gain calculation unit 83b and the braking torque calculation unit 83c.

The swing electric motor control unit 83X calculates power running request torque (step S116). Specifically, the power running request torque Tadd is calculated by the target power running torque calculation unit 83a.

In the hydraulic system shown in FIG. 3, if the output of the hydraulic pump 41 is reduced to lower its delivery flow rate approximately to the standby flow rate and the torque of the swing electric motor 25 is outputted, the swing structure 20 is driven (power running) by the drive torque of the swing electric motor 25. In this case, the swing hydraulic motor 27 is rotated by the swing electric motor 25, and thus the meter-out pressure rises and braking torque occurs.

Therefore, the drive torque of the swing electric motor 25 has to be outputted so as to surpass the braking torque. Even though the meter-out pressure loss increases due to the above-described operation, the bleed-off loss decreases and the efficiency of the whole hydraulic system becomes high since the output of the hydraulic pump 41 can be reduced significantly.

In the case where the swing hydraulic motor 27 outputs the braking torque, the swing electric motor 25 is required to deliver more output than the total torque equivalent to that of the conventional construction machine necessary at the time of power running. However, thanks to the addition of the efficiency of the electric device, the loss can be reduced as a whole compared to the case where the driving is performed by using the hydraulic pressure only.

The swing electric motor control unit 83X judges whether or not the power running request torque Tadd is within a limit value Tadd1 specified by the energy management control block 82 (step S117). If the power running request torque Tadd is judged to be less than the limit value Tadd1, the process advances to step S118, otherwise (greater than the limit value Tadd1) the process advances to step S119.

In the step S118, the swing electric motor control unit 83X outputs the value of the power running request torque as Tadd.

When the power running request torque Tadd is judged to be greater than the limit value Tadd1 in the step S117, the swing electric motor control unit 83X limits the value of the outputted power running request torque by use of the limit value Tadd1 specified by the energy management control block 82 and outputs the limited value (Tadd=Tadd1) (step S119).

The swing electric motor control unit 83X calculates the torque command value Tms2 for the swing electric motor 25 (Tms2=Tms1+Tadd) by adding up the braking motor torque calculated in the step S115 and the torque on the power running side calculated in the step S118 or S119 (step S120). Specifically, this step is executed by the torque command value calculation unit 83d.

The swing electric motor control unit 83X judges whether the relief pressure of a variable overload relief valve has dropped or not (step S121). Specifically, this judgment is made based on the input signal from the relief valve control unit 83e. If the relief pressure has dropped, the process advances to step S122, otherwise (the relief pressure is at the normal value) the process advances to step S125.

In the step S122, the swing electric motor control unit 83X calculates another torque command value Tms3 for the swing electric motor 25 as TR. Specifically, the electric motor torque command value Tms3 is set at TR when the relief pressure of the A port has dropped and the A port pressure is higher than the threshold value P1 or when the relief pressure of the B port has dropped and the B port pressure is higher than the threshold value P1. The value TR is set so that the electric motor torque command value Tms3 occurs (i.e., takes on a value) corresponding to the decrease in the torque of the swing hydraulic motor 27 (from the torque at ordinary times) caused by the drop in the relief pressure.

When the relief pressure is judged to have not dropped in the step S121, the swing electric motor control unit 83X calculates the other torque command value Tms3 for the swing electric motor 25 as 0 (step S125).

The swing electric motor control unit 83X selects the greater value from the swing electric motor torque command values Tms2 and Tms3 (step S123). Specifically, this step is executed by the torque command value calculation unit 83d and the selected value is used as the swing electric motor torque command value Tms.

The swing electric motor control unit 83X performs the torque limitation process and the torque change rate limitation process on the swing electric motor torque command value Tms determined in the step S123 and outputs the final swing electric motor torque command Tms (step S124).

After executing the step S124, the swing electric motor control unit 83X returns to the step S111 via "RETURN" and starts the process again.

The torque command value Tms for the swing electric motor 25 calculated by the above processing flow is outputted to the power control unit 55.

By the above-described method for calculating the torque command for the swing electric motor 25, the swing structure driving/braking characteristics by the swing hydraulic motor in the conventional construction machine can be imitated by the swing electric motor 25. In this embodiment, the power running request torque Tadd calculated as a request for the power running imitates the meter-in characteristic of the swing hydraulic motor, while the swing electric motor torque command value Tms1 calculated as a request for the regeneration imitates the meter-out characteristic. This makes it possible to realize swing characteristics equivalent to those of the swing hydraulic motor.

Accordingly, swing operability equivalent to that in the conventional hydraulic construction machines can be secured.

Figure 13:
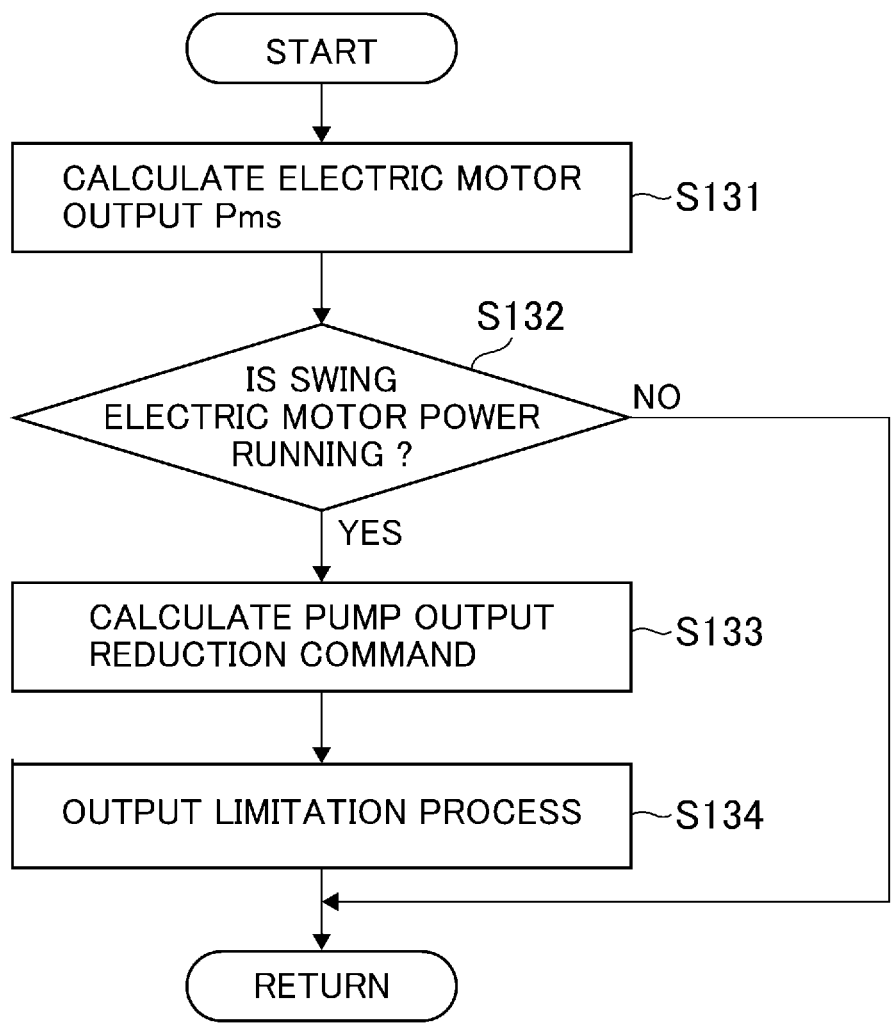
FIG. 13 is a flow chart showing a processing flow for calculating a pump output reduction command in the construction machine according to the embodiment of the present invention.

Next, a method for reducing the output of the hydraulic pump in the construction machine according to the embodiment of the present invention will be explained below by referring to FIG. 13. FIG. 13 is a flow chart showing a processing flow for calculating the pump output reduction command in the construction machine according to the embodiment of the present invention. Reference characters in FIG. 13 identical to those in FIGS. 1-12 represent elements identical to those in FIGS. 1-12, and thus detailed explanation thereof is omitted here.

In this embodiment, when the drive torque is generated by the swing electric motor 25, control for reducing the capacity (displacement) of the hydraulic pump 41 is performed so as to reduce the amount of work done on the swing structure 20 by the swing hydraulic motor 27 by the amount of work done on the swing structure 20 by the swing electric motor 25. By this control, the load on the engine 22 can be reduced.

The process shown in FIG. 13 is executed mainly by the hydraulic pump output reduction control unit 83f and the pump absorption torque correction calculation unit 83g of the controller 80.

The hydraulic pump output reduction control unit 83f calculates the output Pms of the swing electric motor 25 (step S131). Specifically, the output Pms of the swing electric motor 25 is calculated by multiplying the signal of the electric motor torque command value Tms (calculated by the torque command value calculation unit 83d) by the swing motor speed Ws according to the following expression:

$$Pms = Tms \times Ws \qquad (2)$$

The hydraulic pump output reduction control unit 83f judges whether the swing electric motor 25 is in the power running state or not (step S132). Specifically, the swing electric motor 25 is judged to be in the power running state if the output Pms of the swing electric motor 25 calculated according to the expression (2) is higher than or equal to 0. If the swing electric motor 25 is judged to be in the power running state, the process advances to step S133, otherwise the process advances to "RETURN".

In the step S133, the hydraulic pump output reduction control unit 83f calculates the pump output reduction command. Specifically, the hydraulic pump output reduction control unit 83f first calculates the pump output reduction rate by referring to the table formed based on the swing lever operation amount and the swing motor speed and then calculates the pump output reduction command by multiplying the output Pms of the swing electric motor 25 by the pump output reduction rate.

The hydraulic pump output reduction control unit 83f performs an output limitation process (step S134). Specifically, the output limitation process is performed on the pump output reduction command and thereafter the pump absorption torque command is outputted by the pump absorption torque correction calculation unit 83g to the regulator 41a. As a result, the tilting angle of the swash plate of the hydraulic pump 41 is controlled by the regulator 41a, by which the output of the hydraulic pump 41 is reduced.

After executing the step S134 or when the swing electric motor 25 is not judged to be in the power running state in the step S132, the hydraulic pump output reduction control unit 83f and the pump absorption torque correction calculation unit 83g return to the step S131 via "RETURN" and start the process again.

According to the above-described embodiment of the construction machine in accordance with the present invention, at the time of the power running of the swing electric motor 25, the control is performed to reduce the power of the hydraulic pump 41 by considering the output of the swing electric motor 25 while taking the hydraulic pump efficiency into account. Therefore, power of the hydraulic pump 41 necessary for the swing driving can be secured. Consequently, excellent operability can be secured and a great fuel cost reduction effect can be achieved.

Further, according to the above-described embodiment of the construction machine in accordance with the present invention, the torque of the swing electric motor 25 at the time of the power running is calculated based on the operation amount of the swing control lever 72 and the swing speed of the swing structure 20. Therefore, the change in the torque of the swing hydraulic motor 27, changing depending on the operation amount of the swing control lever 72 and the load, can be compensated for by the swing electric motor 25. Consequently, desired torque can be obtained and excellent operability can be secured.

DESCRIPTION OF REFERENCE CHARACTERS 10 track structure
11 crawler
12 crawler frame
13 right travel hydraulic motor
14 left travel hydraulic motor
20 swing structure
21 swing frame
22 engine
24 capacitor
25 swing electric motor
26 deceleration mechanism
27 swing hydraulic motor
28 variable overload relief valve
29 variable overload relief valve
30 front work implement
31 boom
32 boom cylinder
33 arm
34 arm cylinder
35 bucket
36 bucket cylinder
40 hydraulic system
41 hydraulic pump
41a regulator (delivery capacity regulating device)
42 control valve
44 swing spool
51 chopper
52 swing electric motor inverter
54 smoothing capacitor
55 power control unit
72 swing control lever
74 hydraulic/electric signal conversion unit
75 electric/hydraulic signal conversion unit
80 controller
82 energy management control block
83 hydraulic/electric combined swing control block
83d torque command value calculation unit
83f hydraulic pump output reduction control unit

The invention claimed is:
1. A construction machine comprising:
an engine;
a hydraulic pump of the variable displacement type which is driven by the engine;

a swing structure;

a swing hydraulic motor which drives the swing structure by using hydraulic fluid delivered from the hydraulic pump;

an electrical storage device which stores and supplies electric power;

a swing electric motor which drives the swing structure by using the electric power supplied from the electrical storage device;

a swing control lever which is operated to command driving of the swing structure;

a delivery capacity regulating device which regulates the delivery capacity of the hydraulic pump;

a control unit which controls the driving/braking of the swing structure by using a sum total of torque of the swing hydraulic motor and torque of the swing electric motor by driving both the swing hydraulic motor and the swing electric motor when the swing control lever is operated; and an operation amount detection device which detects an operation amount of the swing control lever and a speed detection device which detects a speed of the swing electric motor, wherein the control unit comprises:

a torque command value calculation unit which takes in an operation amount signal representing the operation amount of the swing control lever detected by the operation amount detection device and a speed signal representing the speed of the swing electric motor detected by the speed detection device and calculates a torque command value for the swing electric motor based on the operation amount signal and the speed signal; and a hydraulic pump output reduction control unit that:

controls the delivery capacity regulating device by calculating a reduction rate of the output of the hydraulic pump based on the torque command value for the swing electric motor calculated by the torque command value calculation unit, and calculates the reduction rate of the hydraulic pump as a higher value when the operation amount of the swing control lever is equal to or less than a prescribed control amount, and calculates the reduction rate of the output of the hydraulic pump as a lower value with an increase in the operation amount of the swing control lever that is higher than a prescribed operation amount.

2. The construction machine according to claim 1,
wherein the hydraulic pump output reduction control unit calculates the reduction rate of the output of the hydraulic pump as a lower value with the increase in the speed of the swing electric motor.

3. The construction machine according to claim 2,
wherein the hydraulic pump output reduction control unit gradually decreases the reduction rate as the operation amount of the swing control lever increases when the operation amount is higher than the prescribed amount.

* * * * *